(12) United States Patent
Huber et al.

(10) Patent No.: US 11,356,001 B2
(45) Date of Patent: Jun. 7, 2022

(54) COOLING DEVICE FOR A STATOR OF AN ELECTRICAL MACHINE, ELECTRICAL MACHINE AND MOTOR VEHICLE

(71) Applicant: Bayerische Motoren Werke Aktiengesellschaft, Munich (DE)

(72) Inventors: Andreas Huber, Schoenberg (DE); Benjamin Krank, Munich (DE); Jens Richter, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/435,157

(22) PCT Filed: Mar. 9, 2020

(86) PCT No.: PCT/EP2020/056168
§ 371 (c)(1),
(2) Date: Aug. 31, 2021

(87) PCT Pub. No.: WO2020/200661
PCT Pub. Date: Oct. 8, 2020

(65) Prior Publication Data
US 2022/0045575 A1    Feb. 10, 2022

(30) Foreign Application Priority Data

Apr. 1, 2019  (DE) ..................... 10 2019 108 436.9

(51) Int. Cl.
*H02K 9/19*    (2006.01)
*H02K 5/20*    (2006.01)
*H02K 3/24*    (2006.01)

(52) U.S. Cl.
CPC ................. *H02K 9/19* (2013.01); *H02K 3/24* (2013.01); *H02K 5/203* (2021.01)

(58) Field of Classification Search
CPC ............... H02K 3/24; H02K 5/20; H02K 9/19
(Continued)

(56) References Cited

U.S. PATENT DOCUMENTS 5,973,427 A    10/1999  Suzuki et al.
7,737,584 B2    6/2010  Müller et al.
(Continued)

FOREIGN PATENT DOCUMENTS

BE        1015432 A3    3/2005
DE    198 13 160 A1   11/1998
(Continued)

OTHER PUBLICATIONS

International Search Report (PCT/ISA/210) issued in PCT Application No. PCT/EP2020/056168 dated May 15, 2020 with English translation (four (4) pages).
(Continued)

*Primary Examiner* — Quyen P Leung
*Assistant Examiner* — Minki Chang
(74) *Attorney, Agent, or Firm* — Crowell & Moring LLP

(57) ABSTRACT

A cooling device for a stator of an electrical machine, for fitting together with a hollow cylindrical laminated core of the stator, includes multiple cooling channels for conducting cooling fluid along the laminated core, and a fluid ring for provision on an end face of the laminated core. The fluid ring has two fluid ring channels for distributing the cooling fluid to the cooling channels and for receiving the cooling fluid from the cooling channels, and at least two cooling fluid connections for introducing and removing the cooling fluid into and from the fluid ring channels. The fluid ring channels have circumferential-angle-dependent flow cross-sections in the flow direction, in order to evenly distribute the cooling fluid to the cooling channels.

12 Claims, 13 Drawing Sheets

(58) Field of Classification Search
USPC .......................................................... 310/54
See application file for complete search history.

(56) References Cited

U.S. PATENT DOCUMENTS

| | | | |
|---|---|---|---|
| 9,048,710 B2* | 6/2015 | Chamberlin | ............. H02K 3/24 |
| 2004/0145252 A1 | 7/2004 | Arimitsu et al. | |
| 2010/0176669 A1 | 7/2010 | Houle et al. | |
| 2014/0139057 A1 | 5/2014 | Ho et al. | |
| 2016/0056683 A1 | 2/2016 | Nakanishi et al. | |
| 2020/0185985 A1 | 6/2020 | Blum et al. | |

FOREIGN PATENT DOCUMENTS

| | | |
|---|---|---|
| DE | 10 2015 012 913 A1 | 4/2017 |
| DE | 10 2017 211 317 A1 | 1/2019 |
| JP | 2016-46913 A | 4/2016 |

OTHER PUBLICATIONS

German-language Written Opinion (PCT/ISA/237) issued in PCT Application No. PCT/EP2020/056168 dated May 15, 2020 (eight (8) pages).

German-language Office Action issued in German Application No. 10 2019 108 436.9 dated Jan. 21, 2021 with English translation (six (6) pages).

German-language Search Report issued in German Application No. 10 2019 108 436.9 dated Nov. 11, 2019 with partial English translation (12 pages).

German-language Decision to Grant issued in German Application No. 10 2019 108 436.9 dated Apr. 19, 2021 with English translation (10 pages).

* cited by examiner

COOLING DEVICE FOR A STATOR OF AN ELECTRICAL MACHINE, ELECTRICAL MACHINE AND MOTOR VEHICLE

BACKGROUND AND SUMMARY OF THE INVENTION

The invention relates to a cooling device for a stator of an electric machine, for fitting together with a hollow-cylindrical laminated core of the stator. The cooling device has a plurality of cooling ducts for directing cooling fluid along the laminated core. Moreover, the cooling device has a fluid ring for disposing on an end side of the laminated core. The fluid ring is connected to the cooling ducts and, in a flow direction oriented along a circumferential direction, is able to be passed through by a flow of cooling fluid. The fluid ring has two fluid ring ducts in the form of a distribution duct for distributing the cooling fluid to the cooling ducts and a collection duct for receiving the cooling fluid from the cooling ducts, as well as at least two cooling fluid connectors in the form of at least one inflow connector for directing the cooling fluid into the distribution duct and at least one outflow connector for retrieving the cooling fluid from the collection duct. The invention moreover relates to an electric machine as well as to a motor vehicle.

The focus here is on electric machines for motor vehicles, in particular electric propulsion machines for electric or hybrid vehicles. These machines typically have a stator and a rotor which is mounted so as to be rotatable in relation to the stator. The stator has a hollow-cylindrical laminated core, winding grooves with windings being disposed in the side of the laminated core that faces the rotor. The electric machine heats up during the operation of the electric machine, as a result of which the output of the electric machine may decrease. Overheating of the electric machine can even lead to a failure of the latter.

It is therefore known from the prior art for the stator of the electric machine to be cooled. To this end, cage-type cooling devices which have cooling ducts, for example for disposal in the winding grooves, and for directing cooling fluid along the laminated core are known, for example. The cooling ducts are coupled in a flow conducting manner, or fluidically, respectively, to a distribution duct which directs the cooling fluid into the cooling ducts, and to a collection duct which retrieves the cooling fluid from the cooling ducts. The distribution duct and the collection duct can be configured separately from one another, for example as a distribution ring and collection ring, wherein the distribution ring is disposed on a first end side of the laminated core and the collection ring is disposed on a second end side of the laminated core, the second end side being axially opposite the first end side. Such double-sided cooling solutions are disadvantageous, above all with a view to assembling the stator in a stator housing, because cooling fluid connectors which are disposed on the distribution ring and the collection ring are then barely accessible in the stator housing which can typically be accessed only from one side.

There are also single-sided cooling solutions in which the distribution duct and the collection duct are integrated in a fluid ring which is disposed on one of the end sides of the laminated core. Such single-sided cooling solutions to date have the disadvantage that the cooling efficiency of the former is insufficient by virtue of the cooling fluid not being uniformly distributed to the cooling ducts. Moreover, such fluid rings with a distribution duct and a collection duct have a large requirement in terms of installation space and can thus be integrated in the available installation space of the electric machine only with difficulty, if at all.

It is an object of the present invention to provide particularly space-saving and efficient cooling of the stator of an electric machine for a motor vehicle.

This object is achieved according to the invention by a cooling device, by an electric machine, as well as by a motor vehicle, having the features according to the claimed invention.

A cooling device according to an embodiment of the invention for a stator of an electric machine, for fitting together with a hollow-cylindrical laminated core of the stator, has a plurality of cooling ducts for directing cooling fluid along the laminated core. Moreover, the cooling device has a fluid ring which, for disposing on an end side of the laminated core, is connected to the cooling ducts and, in a flow direction oriented along a circumferential direction, is able to be passed through by a flow of cooling fluid. The fluid ring has two fluid ring ducts in the form of a distribution duct for distributing the cooling fluid to the cooling ducts, and a collection duct for receiving the cooling fluid from the cooling ducts, as well as at least two cooling fluid connectors in the form of at least one inflow connector for directing the cooling fluid into the distribution duct and at least one outflow connector for retrieving the cooling fluid from the collection duct. Moreover, the fluid ring ducts, for uniformly distributing the cooling fluid to the cooling ducts, in the flow direction have flow cross sections which are a function of the location or a function of the circumferential angle, respectively. The distribution duct is configured with a first flow cross section which, proceeding from the at least one inflow connector, decreases as the number of cooling ducts already supplied with cooling fluid increases. The collection duct is configured with a second flow cross section which increases as the number of already emptied cooling ducts increases and increases toward the at least one outflow connector.

The invention moreover relates to an electric machine for a motor vehicle, having a stator, a rotor which is mounted so as to be rotatable in relation to the stator, and a cooling device according to the invention. The stator has a hollow-cylindrical laminated core having one side which faces the rotor and which has axially extending winding grooves which are distributed in a circumferential direction. The stator moreover has windings which are disposed in the winding grooves. The fluid ring of the cooling device is disposed on a first end side of the laminated core, and the cooling ducts are disposed on the laminated core, in particular in the winding grooves.

The stator has the hollow-cylindrical laminated core, or the ferrous core of the stator, respectively, as well as the electrical windings. The hollow-cylindrical laminated core here has two axially mutually opposite end sides. The rotor of the electric machine can be rotatably mounted in the cylindrical cavity which is enclosed by the hollow-cylindrical laminated core, wherein a rotation axis of the rotor corresponds to an axially extending longitudinal axis of the laminated core. The laminated core on one side, in particular the internal side that faces the cavity, has the winding grooves, or stator grooves, for receiving the windings. The winding grooves in the direction of the circumference (circumferential angle), thus tangentially to the rotation axis, are in particular disposed so as to be mutually equidistant and distributed across an entire circumference of that side of the lamination core that faces the rotor. The winding grooves in the axial direction extend from the first end side of the laminated core up to the opposite second end side of the laminated core. In the axial direction, thus along the rotation axis, the windings which are disposed in the winding grooves protrude beyond the laminated core at the end sides and at the latter form in each case one set of end windings. The windings of the stator can be configured as shaped-bar windings or round-wire windings, for example.

The cooling device is configured as a cooling cage which can be fitted together with the laminated core. The cooling cage can be coupled to a cooling circuit of the electric machine that provides the cooling fluid, and is thus configured for cooling the stator during the operation of the electric machine. The cooling fluid can be a cooling liquid, for example. The cooling cage has the fluid ring and the cooling ducts. The fluid ring in the disposed state here protrudes from the cavity and protrudes beyond the first end side of the laminated core. A single-sided cooling solution is thus provided by the one fluid ring. The fluid ring is in particular a toroidal hollow member, the cooling fluid provided by the cooling circuit being able to be guided in the fluid ring interior of the toroidal hollow member. The fluid ring is disposed so as to radially neighbor the set of end windings on the first end side. The fluid ring and the set of end windings are thus disposed so as to be mutually concentric. By disposing the fluid ring so close to the set of end windings, where a particularly intense generation of heat in the form of so-called hotspots arises during the operation of the electric machine, the set of end windings can be cooled in a particularly efficient manner. A continuous output of the electric machine at stator-critical operating points can be increased as a result.

The fluid ring here has the fluid ring ducts, that is to say the distribution duct and the collection duct, and the cooling fluid connectors, that is to say the at least one inflow connector and the at least one outflow connector. The fluid ring has in particular exactly one inflow connector and exactly one outflow connector. The cooling fluid can be supplied to the distribution duct by way of the inflow connector. The distribution duct is conceived for distributing the cooling fluid to the cooling ducts, or directing the cooling fluid into the cooling ducts, respectively. The collection duct is conceived for retrieving the cooling fluid from the cooling ducts again, or for collecting the cooling fluid again, respectively. The collected cooling fluid can be retrieved from the fluid ring again by way of the outflow connector. The distribution duct and the collection duct here are configured so as to be annular and encircling in the circumferential direction. The cooling fluid connectors here can be configured in the shape of connection ports and be disposed so as to project axially on the fluid ring, for example.

The cooling ducts here, while configuring a cooling duct crown, are disposed so as to be distributed in the circumferential direction and project axially on the fluid ring. The fluid ducts are configured so as to be bidirectionally conducting, or bidirectionally flow-conducting. This means that each cooling duct has one axially extending supply flow portion, which is fluidically coupled to the distribution duct, one axially extending return flow portion, which is fluidically coupled to the collection duct, and one tangentially extending deflection portion, which is fluidically coupled to the supply flow portion and the return flow portion. Each cooling duct, proceeding from the fluid ring which is disposed on the first end side of the laminated core, thus directs the cooling fluid axially within the supply flow portion in the direction of the second end side of the laminated core, by way of the deflection portion into the return flow portion, and within the return flow portion axially back to the fluid ring. The cooling ducts here can be disposed on the laminated core in such a manner that the cooling ducts extend axially beyond a side of the laminated core. For example, the cooling ducts can be configured as groove cooling ducts and be disposed conjointly with the windings in the winding grooves of the laminated core. Alternatively thereto, the cooling ducts can also be disposed so as to bear on one side of the laminated core that is opposite the side having the winding grooves. In the case of winding grooves which are disposed in the internal side of the laminated core, the cooling ducts can be disposed on the external side of the laminated core. It can be provided here that the side that does not have any winding grooves has axially running cooling duct grooves in which the cooling ducts can be disposed. The cooling ducts can thus be disposed in a particularly space-saving manner on the laminated core.

For example, the cooling ducts are configured in the form of loops, thus as cooling loops, so that the supply flow portion and the return flow portion of a cooling duct are disposed so as to be mutually spaced apart along the circumferential direction and configured as elongate duct regions which run in parallel. For example, the supply flow portion of a cooling duct can be disposed in a first winding groove or in a first cooling duct groove, and the return flow portion of the same cooling duct can be disposed in a second winding groove, neighboring the first winding groove, or in a second cooling duct groove, neighboring the first cooling duct groove. The cooling fluid here can be directed from the supply flow portion to the return flow portion by way of the deflection portion. The deflection portion can be configured for disposal on a second end side of the laminated core, so as to run across a stator tooth which is disposed between the first and the second winding groove, or a stator tooth which is disposed between the first and the second cooling duct groove, for example. Cooling ducts configured in such a manner can be produced in a particularly simple manner. It can also be provided that the supply flow portion and the return flow portion of a cooling duct are configured so as to be mutually adjacent such that one cooling loop can be disposed in each winding groove or in each cooling duct groove, for example. The cooling ducts can be integrally configured. The cooling ducts can be fitted together with the fluid ring, for example, and be connected in a fluid-tight manner to the fluid ring prior to the disposal of the cooling cage on the laminated core. In order to enable the cooling cage to be axially fitted together with the laminated core, the cooling ducts can be reversibly flexible in a radially inward or outward manner. In order for the cooling fluid which is to be directed into the cooling ducts to now be distributed uniformly to the cooling ducts, the annular distribution duct or distribution ring, respectively, has the first flow cross section which is variable in the flow direction. Proceeding from the inflow connector, by way of which the cooling fluid is directed into the distribution duct, the cooling fluid separates toward the left and toward the right, and in the flow direction flows along the circumferential direction through the distribution duct. In other words, part of the cooling fluid flows in the circumferential direction, for example in the clockwise direction, through a left-hand half of the distribution duct, and another part of the cooling fluid flows counter to the circumferential direction, for example in a counter-clockwise direction, through a right-hand half of the distribution duct. The cooling fluid flow on the path of the cooling fluid through the distribution duct gradually dispenses cooling fluid into the supply flow portions of the cooling ducts. A quantity of the cooling fluid in the distribution duct thus decreases in the flow direction as the spacing from the inflow connector increases, because the number of cooling ducts already supplied with cooling fluid increases. In contrast, the second flow cross section of the collection duct increases in the flow direction as the quantity of collected cooling fluid in the collection duct increases. The quantity of cooling fluid in the collection duct increases again as more cooling ducts have already been emptied and as the spacing from the outflow connector decreases. When viewed counter to the flow direction, the flow cross section, proceeding from the outflow connector, decreases as the number of already emptied cooling ducts decreases. The flow cross sections of the fluid ring ducts are thus a function of a value of the circumferential angle along the circumferential direction.

A uniform distribution of the flow in the cooling ducts can advantageously be improved, and effective and uniform cooling accompanied with a minor pressure loss thus achieved, by this variable flow cross section along the circumferential direction.

It can be provided here that the fluid ring ducts are disposed so as to radially neighbor one another and, by way of ends of the supply flow portions and of the return flow portions that are connected to the fluid ring for connecting to the respective fluid ring duct, are configured so as to be radially mutually offset and/or mutually offset along the circumferential direction. The first fluid ring duct, for example the distribution duct, is thus radially outside and encloses the radially inner second fluid ring duct, for example the collection duct. The fluid ring ducts are thus disposed so as to be mutually concentric about the rotation axis. In order for the bi-directionally conducting cooling ducts to now be able to be fluidically coupled to the distribution duct as well as to the collection duct, the ends of one cooling duct can be disposed so as to be radially mutually offset. For example, the ends of the supply flow portions and/or of the return flow portions can be bent radially inward or outward, respectively. For example, the ends of one of the portions, for example of the return flow portions, that are bent radially inward thus configure a radially inner end crown, so as to be connected to the radially inner fluid ring duct, and the ends of the other portions, for example of the supply flow portions, that are bent radially outward, thus configure a radially outer end crown, so as to be connected to the radially outer fluid ring duct. Alternatively thereto, the ends may also be mutually offset only in the circumferential direction, thus be configured without bends. The radial connection between the inner fluid ring duct and the associated connection ports, and the radial connection between the outer fluid ring duct and the associated connection ports, here are thus integrated in the fluid ring. As a result, the cooling duct ends can simply protrude axially straight from the laminated core, as a result of which the production of the cooling ducts is facilitated.

The inflow connector and the outflow connector are preferably radially mutually opposite and to this end are disposed so as to be mutually offset by approximately 180° along the circumferential direction. The inflow connector is thus situated at a circumferential angle of 0°, for example, while the outflow connector is situated at a circumferential angle of approximately 180°. Proceeding from the inflow connector, the flow direction along the circumferential direction is thus oriented in the direction of the outflow connector. Proceeding from the inflow connector, the cooling fluid flows in and counter to the circumferential direction through the distribution duct and through the cooling ducts into the collection duct, within the collection duct flows in the direction of the outflow connector, and converges again at the outflow connector.

It can be provided here that the first flow cross section and the second flow cross section in the flow direction, proceeding from the inflow connector in the direction of the outflow connector, are configured so as to be variable in opposite directions such that an overall flow cross section of the fluid ring is consistent along the circumferential direction. In other words, the first flow cross section in the flow direction decreases to the same extent as the second flow cross section increases. The overall flow cross section of the fluid ring in the flow direction is thus divided according to requirements to the first flow cross section of the distribution duct and the second flow cross section of the collection duct. The installation space of the fluid ring can be kept particularly small by the overall flow cross section of the fluid ring being divided according to requirements in this way.

The fluid ring preferably has a plurality of external walls that enclose a fluid ring interior, and a separation web which is encircling in the circumferential direction and is disposed in the fluid ring interior and, as a function of the circumferential angle, is conceived for dividing an overall flow cross section of the fluid ring interior into the first flow cross section and the second flow cross section. The external walls are in particular configured as two concentrically disposed cylindrical lateral walls, as an annular base with connection ports for the cooling ducts, and as an annular cover which lies axially opposite the annular base and has the cooling fluid connectors.

The annular cover has the axially projecting, port-type cooling fluid connectors, for example. The cooling fluid connectors here are in particular configured so as to be integral to the cover. The cooling fluid connectors and the cover can also be configured in multiple parts. The base has the connection ports for the cooling ducts. The connection ports can be configured as plug openings or plug sockets, for example, into which the ends of the portions of the cooling ducts can be plugged. To this end, the base can have a first annular assembly having first connection ports for fitting together with the ends of the supply flow portions, and a second annular assembly having second connection ports for fitting together with the ends of the return flow portions. The annular assemblies having the connection ports are disposed so as to be mutually concentric. In loop-shaped cooling ducts in which the ends of the portions are moreover disposed so as to be mutually spaced apart along the circumferential direction, the first and the second connection ports can be configured so as to be offset, or alternating, respectively, along the circumferential direction.

The separation web which in the flow direction is conceived for dividing the overall flow cross section into the two fluid ring ducts according to requirements is situated in the fluid ring interior. The separation web in the flow direction is in particular conceived for dividing the overall flow cross section in the radial direction and the axial direction as a function of the circumferential angle. As a result, the radial proportions and the axial proportions of the flow cross sections of the overall flow cross section can be defined in the flow direction in order for the flow cross sections to be defined as a function of the circumferential angle. The separation web, for dividing the overall flow cross section as a function of the circumferential angle, has a geometry which is a function of the circumferential angle.

It can be provided here that at least the fluid ring is configured from a plastics material or from a sheet metal. Should the fluid ring be configured from a plastics material, the separation web and the annular base, which has the connection ports, can be integrally configured, for example. Should the fluid ring be configured from sheet metal, the separation web and the base can be configured in multiple parts from sheet-metal parts. The separation web and the base can thus be formed from two annular elements which are nested in one another, for example, wherein one of the annular elements is assigned to the distribution duct and the other one of the annular elements is assigned to the collection duct.

It proves advantageous for the separation web in a first fluid ring half of the fluid ring, so as to reduce the first flow cross section in the flow direction, to be conceived for increasing an axial proportion of the second flow cross section of the overall flow cross section from a minimum value in the region of the inflow connector up to a maximum value in the region of transitions between the first fluid ring half and a second fluid ring half, thus reducing a radial proportion of the first flow cross section of the overall flow cross section. In the second fluid ring half, the separation web so as to increase the second flow cross section in the flow direction, is conceived for reducing an axial proportion of the first flow cross section of the overall flow cross section from the maximum value in the region of the transitions up to the minimum value in the region of the outflow connector, thus increasing a radial proportion of the second flow cross section of the overall flow cross section. The flow cross sections in the region of the transitions have identical axial and radial proportions of the overall flow cross section and are thus configured so as to be of identical size.

The overall flow cross section can be configured so as to be rectangular, for example. To this end, the fluid ring has a radial overall extent, or overall width, respectively, and an axial overall extent, or overall height, respectively. The radial and the axial overall extent can now be divided among the fluid ring ducts. In the region of the transition, thus in the flow direction so as to be centric between the cooling fluid connectors, the fluid ring ducts are disposed radially next to one another and thus share the radial overall extent of the fluid ring duct. In the axial direction, the fluid ring ducts extend across the axial overall extent of the fluid ring. The flow cross sections of the fluid ring ducts are thus of identical size.

In the region of the inflow connector, the collection duct and the distribution duct are disposed so as to be radially next to one another, but the collection duct has a predetermined, minimum axial extent. As a result, the second flow cross section has the minimum value of the axial proportion of the overall flow cross section. The axial extent of the collection duct is thus significantly smaller than the axial overall extent of the fluid ring. As a result, the distribution duct is disposed not only radially next to the collection duct but also axially above the collection duct. As a result, the first flow cross section also has a larger radial proportion of the overall flow cross section. As a result, the first flow cross section is significantly larger than the second flow cross section. The converse applies in the region of the outflow connector, where the axial extent of the distribution duct is minimal and the first flow cross section thus has the minimum value of the axial proportion of the overall flow cross section. The second flow cross section here is significantly larger than the first flow cross section. Proceeding from the respective cooling fluid connector in the direction of the transitions, the axial proportion of the one flow cross section of the overall flow cross section thus increases, while the radial proportion of the other flow cross section of the overall flow cross section decreases. As a result, the axial proportions and the radial proportions of the flow cross sections of the overall flow cross section approximate one another in the direction of the transitions. A single-sided cooling solution which saves installation space and has an improved uniform distribution of flow can be achieved in a particularly simple manner by such a separation web within the fluid ring interior.

The separation web is preferably configured with a height which is a function of the circumferential angle, and for radially dividing has an axially extending separation wall, and for axially dividing has a collar which has two collar portions and projects radially from the separation wall, wherein a first collar portion which runs within a first fluid ring half of the fluid ring protrudes radially in a first direction and herein defines an axial proportion of the second flow cross section, and a second collar portion which runs within the second fluid ring half protrudes radially in a second direction, counter to the first direction, and herein defines an axial proportion of the first flow cross section.

The separation wall of the separation web here runs parallel to the lateral walls of the fluid ring, and the collar runs in particular so as to be parallel to the annular base and the annular cover. The separation web thus has an L-shaped or angular cross section. A first separation web portion runs within the first fluid ring half, and a second separation web portion runs within the second fluid ring half. The first fluid ring half is assigned to the inflow connector, for example, and, proceeding from the inflow connector, extends 90° in and counter to the circumferential direction, for example. The second fluid ring half is assigned to the outflow connector, for example, and, proceeding from the outflow connector, extends 90° in and counter to the circumferential direction, for example. The transitions between the fluid ring halves are thus disposed so as to be in each case offset by ±90° in relation to the cooling fluid connectors, for example. The axial extent or height, respectively, of one of the fluid ring ducts in the respective fluid ring half, and thus the axial proportion of the flow cross section of this fluid ring duct of the overall flow cross section, can be defined by the respective collar portion. The collar portion here forms a roof above the fluid ring duct that is to be defined in terms of the height, such that the respective other fluid ring duct can be disposed thereabove in the axial direction.

The invention moreover includes a motor vehicle having an electric machine according to the invention. The motor vehicle is in particular configured as a motor vehicle which can be electrically driven, and has the electric machine as a traction machine.

The embodiments and the advantages thereof set forth in the context of the cooling device according to the invention apply in analogous manner to the electric machine according to the invention as well as to the motor vehicle according to the invention.

Further features of the invention will emerge from the claims, from the figures and from the description of the figures. The features and combinations of features mentioned above in the description, and the features and combinations of features mentioned below in the description of the figures and/or shown in the figures alone, may be used not only in the respectively specified combination but also in other combinations or individually.

The invention will now be explained in more detail by way of a preferred exemplary embodiment as well as with reference to the drawings.

DETAILED DESCRIPTION OF THE DRAWINGS

Identical and functionally equivalent elements are provided with the same reference signs in the figures.

Figure 1:
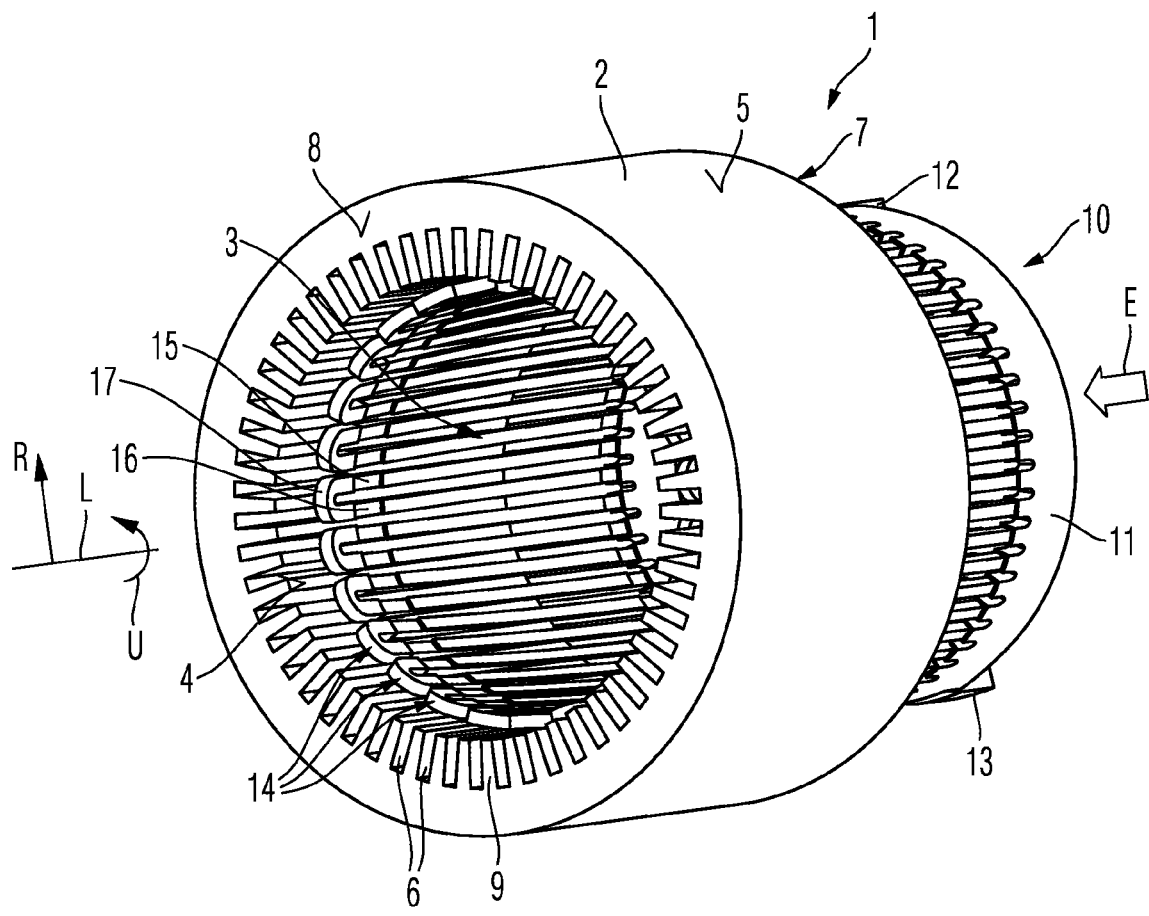
FIG. 1 shows a schematic perspective illustration of an embodiment of a stator according to the invention.

FIG. 1 shows a stator 1 for an electric internal rotor machine of a motor vehicle which can be electrically driven. The stator 1 has a laminated core 2. The laminated core 2 is configured so as to be hollow-cylindrical about a longitudinal axis L of the stator 1 and to encircle the latter in a circumferential direction U. The longitudinal axis L also corresponds to a rotation axis about which a rotor, not shown here, which is mounted within the stator 1, rotates. The laminated core 2 has an internal side 4 which encloses a cylindrical cavity 3. The rotor is mounted in this cavity 3. The laminated core 2 moreover has an external side 5 which in the radial direction R lies opposite the internal side 4. A plurality of winding grooves 6 are configured in the internal side 4 of the laminated core 2, so as to be distributed along the circumferential direction U. The winding grooves 6 extend axially along the longitudinal axis L, across an entire length of the laminated core 2 from a first end side 7 of the laminated core 2 to a second end side 8 of the laminated core 2 which lies axially opposite the first end side 7. Regions of the laminated core 2 between the winding grooves 6 are referred to as stator teeth 9. Windings of the stator 1, which are not visible here, are disposed in the winding grooves 6. The windings here protrude axially beyond the end sides 7, 8 of the laminated core 2 and there form sets of end windings not shown here.

The stator 1 moreover has a cooling device 10 which is configured as a cooling cage and here is shown in a potential variant of design embodiment during the assembly process on the laminated core 2. The cooling device 10 is shown in a separate illustration in FIG. 2. The cooling device 10 has a fluid ring 11 which is disposed in the region of the first end side 7 of the laminated core 2. The set of end windings here, in the disposed state of the cooling device 10 on the laminated core 2, is disposed so as to radially neighbor the fluid ring 11 which projects on the first end side 7, and the set of end windings here would radially enclose the fluid ring 11. The set of end windings and the fluid ring 11 are thus disposed so as to be mutually concentric, wherein the fluid ring 11 here in the radial direction R is further inward than the set of end windings. This is also shown by way of the schematic sectional illustration through the stator 1 according to FIG. 1a.

The fluid ring 11 is configured as a hollow member in which cooling fluid can be directed. The cooling fluid can be provided, for example, by a coolant circuit of the electric machine. The fluid ring 11 for coupling to the coolant circuit has cooling fluid connectors 12, 13. A first cooling fluid connector 12 is configured as an inflow connector, and a second cooling fluid connector 13 is configured as an outflow connector. The cooling fluid can be directed into the fluid ring 11 by way of the inflow connector 12. The cooling fluid can be retrieved from the fluid ring 11 again by way of the outflow connector 13. The inflow connector 12 and the outflow connector 13 are disposed so as to be mutually offset by approximately 180° along the circumferential direction U and thus lie opposite one another in the radial direction R.

The cooling device 10 moreover has a plurality of cooling ducts 14 which in the design embodiment illustrated are configured as groove cooling ducts. The cooling ducts 14 project axially from the fluid ring 11 and are mechanically and fluidically connected to the fluid ring 11. The cooling ducts 14 here are disposed on the fluid ring 11 so as to be distributed in the circumferential direction U and configure a cooling duct crown. The cooling ducts 14 are configured so as to be bidirectionally conducting and to this end have in each case one supply flow portion 15, one return flow portion 16, and one deflection portion 17. The cooling ducts 14 here are configured as cooling loops. To this end, the supply flow portion 15 and the return flow portion 16 are disposed so as to be mutually spaced apart in the circumferential direction U and fluidically connected by way of the deflection portion 17.

Figure 1A:
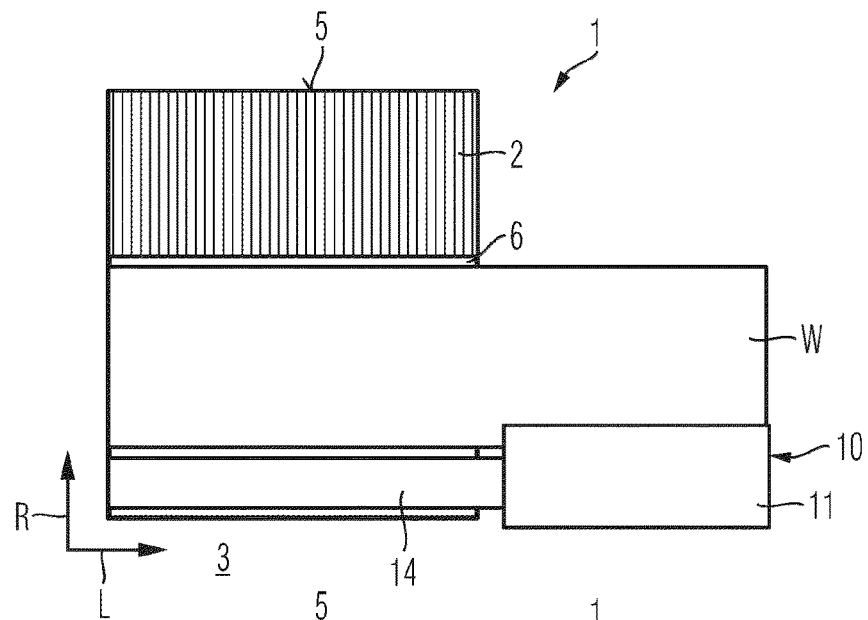
FIGS. 1a, 1b, 1c show schematic sectional illustrations of the stator with different positions of the cooling device.
Figure 1B:
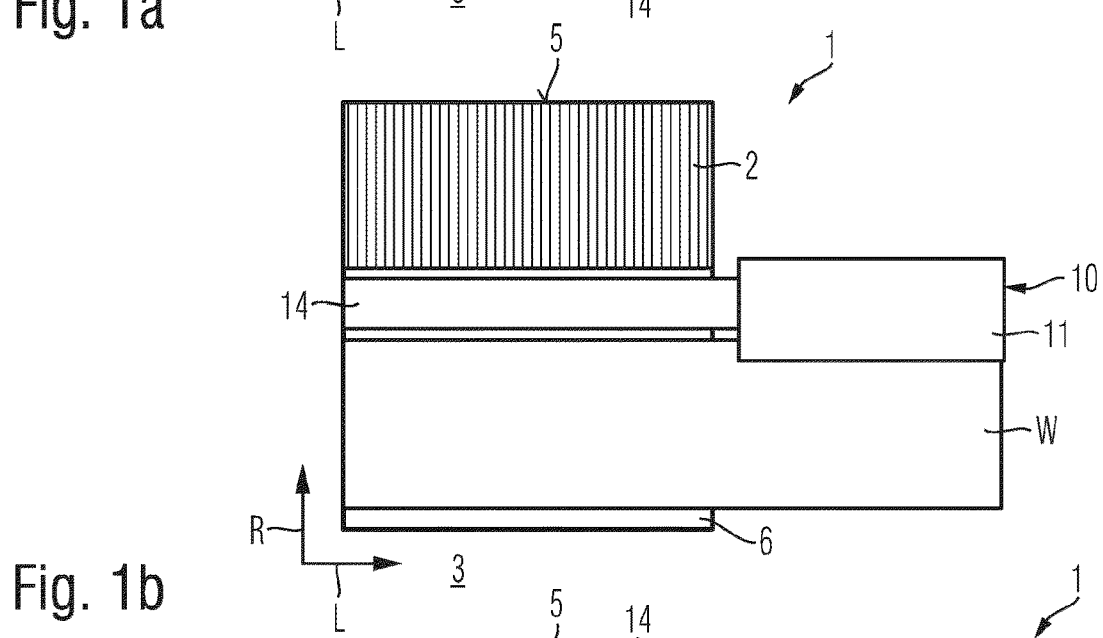
Figure 1C:
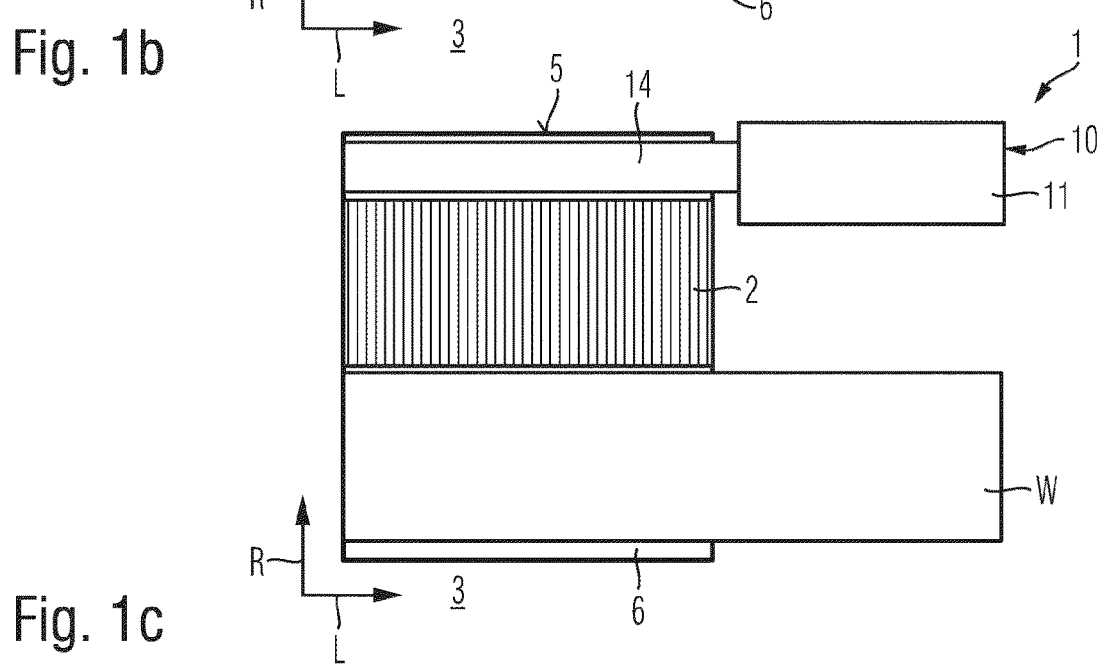
Figure 2:
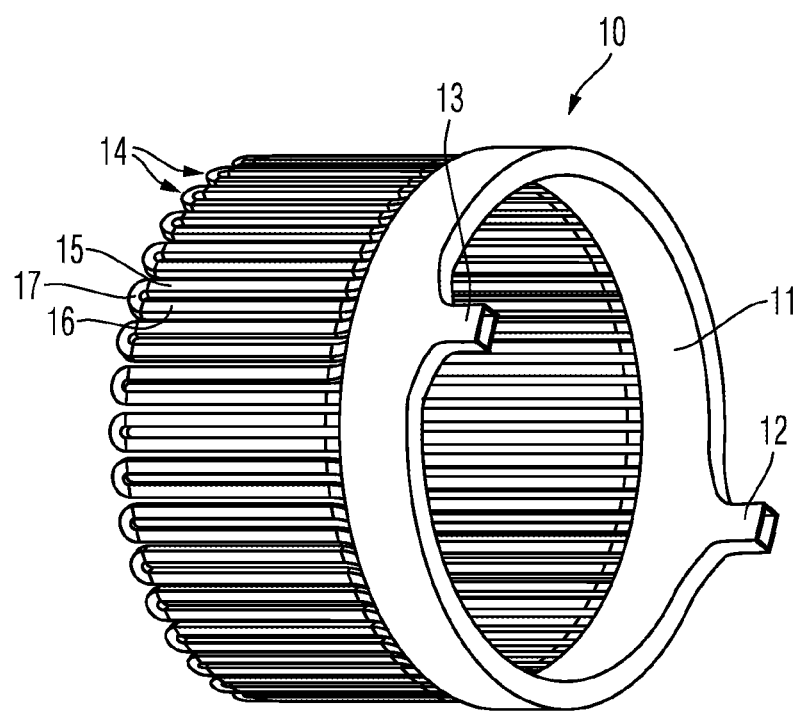
FIG. 2 shows a schematic perspective illustration of an embodiment of an cooling device according to the invention.
Figure 3:
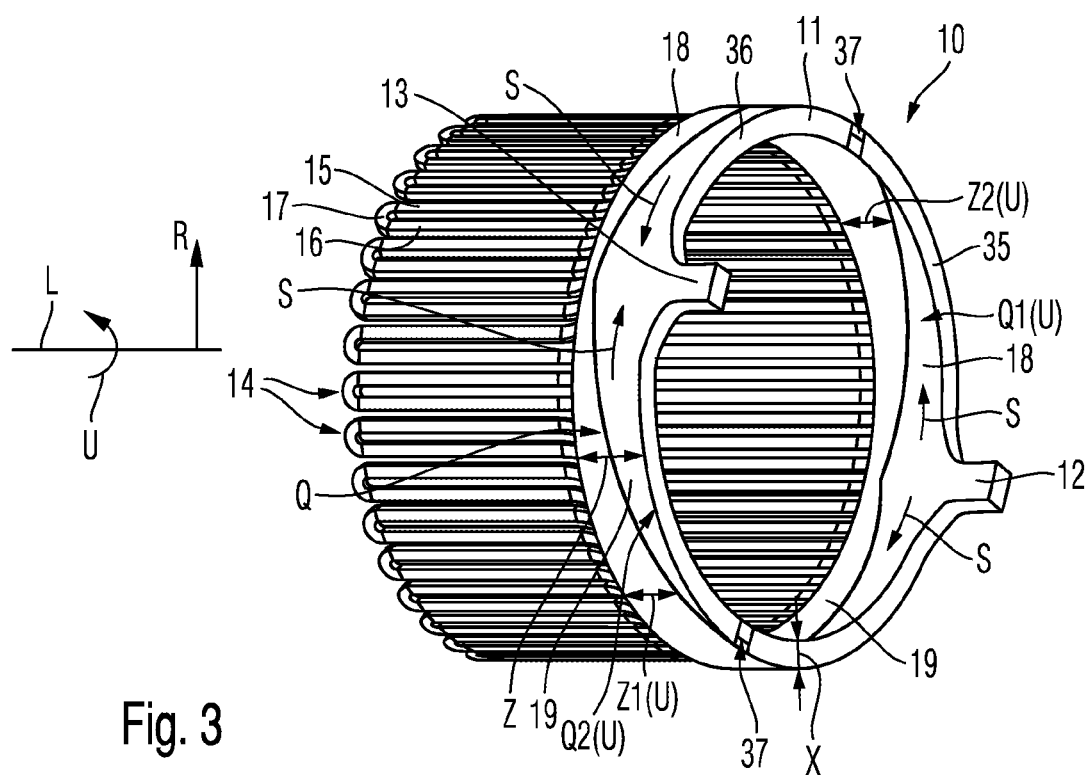
FIG. 3 shows a partially transparent illustration of the cooling device according to FIG. 2.

The cooling device 10 in FIG. 1 is illustrated when being inserted along an axially oriented insertion direction E into the cavity 3 of the laminated core 2. As a result of the loop shape of the cooling ducts 14 shown here, the supply flow portions 15 and return flow portions 16 cannot simply be axially inserted into the winding grooves 6. Therefore, the cooling ducts 14 can be elastically configured, for example, and reversibly bent inward. As a result, an external diameter of the cooling device 10 in the region of the cooling ducts 14 decreases while the cooling ducts 14 are being inserted into the cavity 3. As soon as the deflection portions 17 exit the cavity 3 again at the second end side 8, the cooling ducts 14 can revert to their original shape and bend radially outward again. The supply flow portions 15 and the return flow portions 16 here are inserted radially into the winding grooves 6, and the deflection portions 19 are disposed so as to run across the stator teeth 9 at the second end side 8. However, other possibilities of assembling the cooling device 10 on the laminated core 2 are also conceivable. The supply flow portions 15 and the return flow portions 16 here, conjointly with the windings of the stator 1, are disposed in different winding grooves 6 and thus direct the cooling fluid along the windings in the winding grooves 6. The cooling fluid in the supply flow portion 15 of a winding groove 6 is thus directed from the first end side 7 in the direction of the second end side 8, flows by way of the deflection portion 17 at the second end side 8 into the return flow portion 16 of a neighboring winding groove 6, and from there back to the first end side 7. As is shown in FIG. 1*a*, the cooling ducts 14 here, in the radial direction R, can be disposed ahead of the windings W, thus between the cavity 3 and the windings W, in the winding groove 6. Alternatively thereto, the cooling ducts 14, in the radial direction R, can be disposed behind the windings W in the winding grooves 6, as is shown in FIG. 1*b*. In another design embodiment which is schematically shown in FIG. 1*c*, the cooling ducts 14 can also be disposed on the external side 5 of the laminated core 2. To this end, the external side 5 can have cooling duct grooves in which the cooling ducts 14 can be disposed. The fluid ring 11 in FIG. 1*b* and FIG. 1*c* encloses radially the set of end windings of the windings W. Because the cooling ducts 14 are able to be passed through bidirectionally by a flow, the fluid ring 11 is conceived for supplying the cooling fluid to the cooling ducts 14 as well as for retrieving the cooling fluid from the cooling ducts 14 again. To this end, the fluid ring 11, as is shown by way of the partially transparent illustration in FIG. 3, has two fluid ring ducts 18, 19. A first fluid ring duct 18 is configured as a distribution duct, or a feed duct, respectively, and in a flow-conducting manner is connected to the inflow connector 12 as well as to the supply flow portions 15 of the cooling ducts 14. A second fluid ring duct 19 is configured as a collection duct, or return feed duct, respectively, and in a flow-conducting manner is connected to the outflow connector 13 as well as to the return flow portions 16 of the cooling ducts 14. The distribution duct 18 here is configured so as to be radially outside and encloses the collection duct 19 which lies radially further inward. The cooling fluid which by way of the inflow connector 12 is directed into the fluid ring 11 is divided here at the inflow connector 12 and in the flow direction S, which proceeding from the inflow connector 12 is oriented along the circumferential direction U in the clockwise direction and the counter-clockwise direction, flows within the distribution duct 18 in the direction of a side of the fluid ring 11 which lies radially opposite the inflow connector 12, here thus in the direction of the outflow connector 13. The cooling fluid flowing through the distribution duct 18 here is distributed to the supply flow portions 15 of the cooling ducts 14. The cooling fluid then flows through the cooling ducts 14 and by way of the return flow portions 16 enters the collection duct 19 again. The cooling fluid in the latter, proceeding from the side opposite the outflow connector 13, here thus proceeding from the inflow connector 12, within the collection duct 19 flows likewise in the flow direction S to the outflow connector 13.

In order for the cooling fluid here to be distributed uniformly to the cooling ducts 14, the fluid ring ducts 18, 19 each have a flow cross section Q1(U), Q2(U) which is a function of the circumferential angle. The flow cross sections Q1(U) and Q2(U) are thus a function of the location along the circumferential direction U. An overall flow cross section Q of the fluid ring 11 is substantially consistent along the circumferential direction U. The first flow cross section Q1(U), or feed cross section, respectively, of the distribution duct 18, proceeding from the inflow connector 12, here decreases in the flow direction S and thus as the number of cooling ducts 14 already supplied with cooling fluid increases. The larger the number of cooling ducts 14 already supplied with cooling fluid, the more the quantity of cooling fluid yet to be distributed in the distribution duct 18 decreases. The second flow cross section Q2(U), or return feed cross section, respectively, of the collection duct 19 increases to the same extent in the flow direction S and thus as the number of already emptied cooling ducts 14 increases. The larger the number of already emptied cooling ducts 14, the larger the quantity of cooling fluid that has been collected again in the collection duct 19. A uniform distribution of flow in the cooling ducts 14 can be achieved by these fluid ring ducts 18, 19 having the flow cross section Q1(U), Q2(U) as a function of the circumferential angle.

Figure 4:
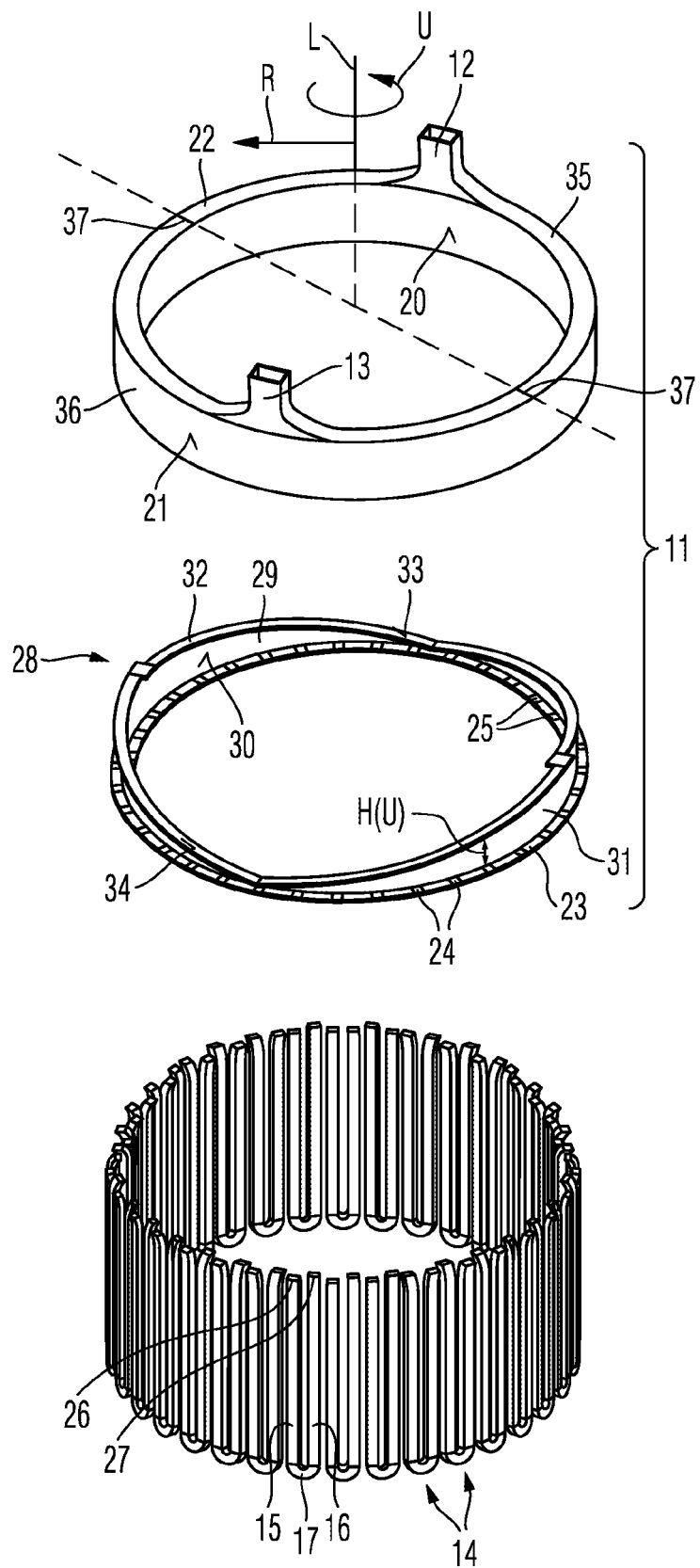
FIG. 4 shows a first exploded illustration of the cooling device.
Figure 5:
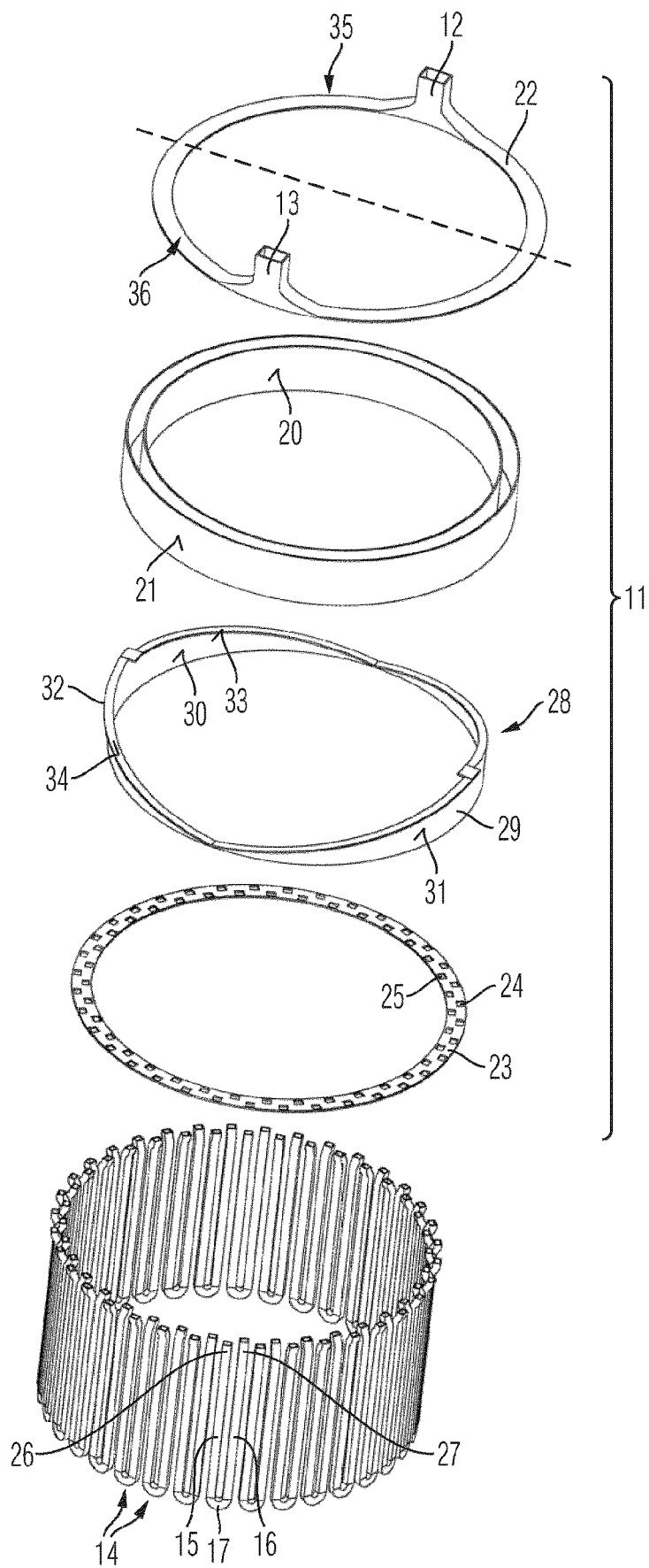
FIG. 5 shows a second exploded illustration of the cooling device.
Figure 6A:
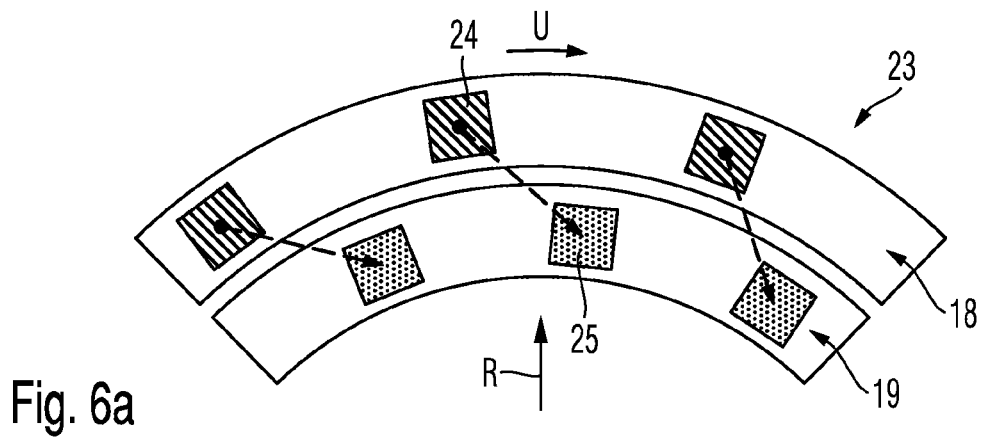
FIGS. 6a to 6d show illustrations of different possibilities of connecting cooling ducts to a fluid ring of the cooling device.

FIG. 4 and FIG. 5 show exploded illustrations of the cooling device 10 having the fluid ring 11 and the crown of cooling ducts 14. The fluid ring 11 has two cylindrical lateral walls 20, 21 which are disposed so as to be mutually concentric, wherein the radially inner lateral wall 20 forms an internal wall, and the radially outer lateral wall 21 forms an external wall. Moreover, the fluid ring 11 comprises an annular cover 22 which comprises the cooling fluid connectors 12, 13, and an annular base 23 which comprises connection ports 24, 25 for the cooling ducts 14. An external geometry of the fluid ring 11 is established by the base 23, the cover 22, and the lateral walls 20, 21. First connection ports 24 are disposed in an annular manner and configured so as to be radially outside in the base 23, and can be connected to the supply flow portions 15 of the cooling ducts 14. Second connection ports 25 are likewise disposed in an annular manner, and configured so as to be radially inside in the base 23, and can be connected to the return flow portions 16 of the cooling ducts 14. The first connection ports 24 and the second connection ports 25 are thus disposed so as to be radially mutually offset. The first connection ports 24 and the second connection ports 25 here are moreover disposed so as to be offset in the circumferential direction U. First connection ports 24 and second connection ports 25 are thus configured so as to alternate in the circumferential direction U. A segment of the base 23 having the connection ports 24, 25 which are disposed so as to be radially mutually offset and mutually offset in the circumferential direction U is shown in FIG. 6*a*.

In order to be able to fluidically and mechanically couple the supply flow portions 15 and the return flow portions 16 to the respective, radially offset connection ports 24, 25, ends 26, 27 of the cooling ducts 14, which are disposed in the manner of a crown, here are likewise configured so as to be radially offset. To this end, first ends 26 of the supply flow portions 15 are bent radially outward, and second ends 27 of the return flow portions 16 are bent radially inward. The connection ports 24, 25 here are configured as plug openings into which the ends 26, 27 of the cooling ducts 14 can be inserted. After insertion, the ends 26, 27 can be connected in a fluid-tight manner to the fluid ring 11 such that the cooling device 10 is configured so as to be ready for insertion.

Figure 6B:
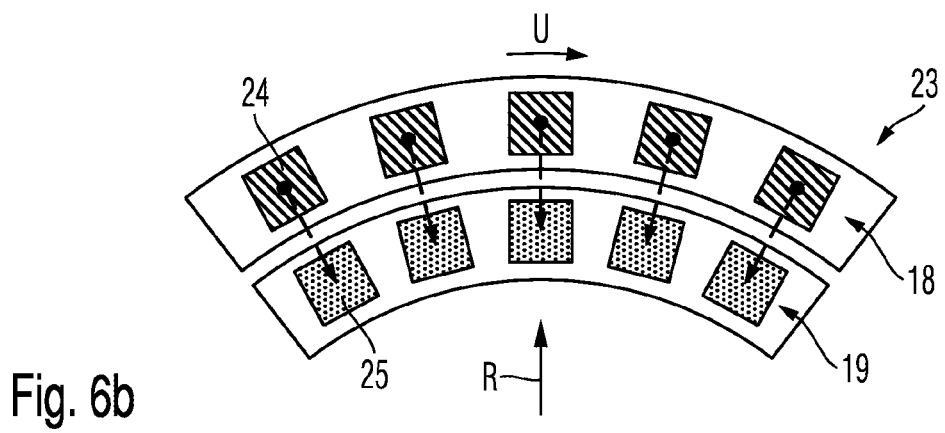
Figure 6C:
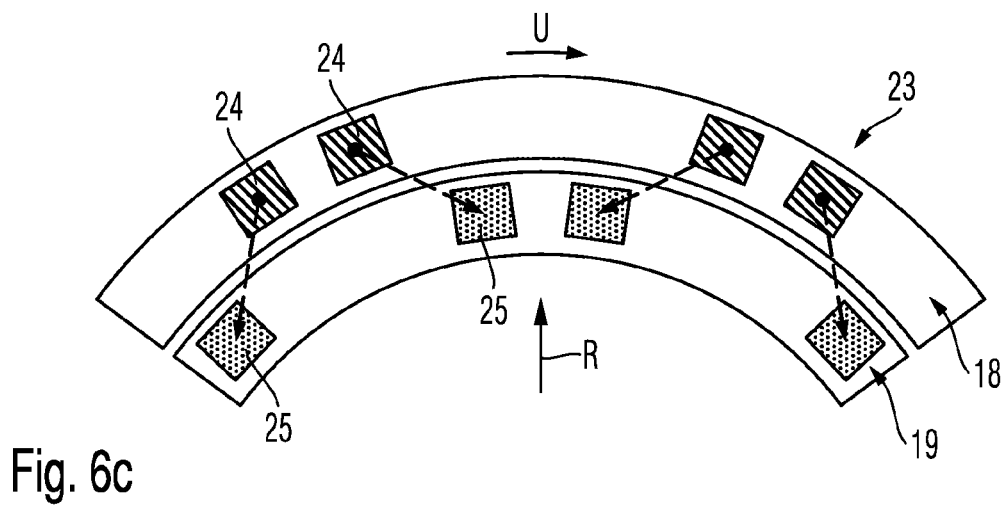

Further embodiments of the base 23 are shown in FIG. 6*b* and FIG. 6*c*. The first connection ports 24 and the second connection ports 25 in FIG. 6*b* are disposed so as to be offset only radially but not along the circumferential direction U. The region of the base 23 which has the first connection ports 24 and is assigned to the distribution duct 18, as well as the region of the base 23 which has the second connection ports 25 and is assigned to the collection duct 19, are thus configured so as to be fully populated. This is possible, for example, when an entire cooling duct 14 is disposed in each winding groove 6. The supply flow portion 15 and the return flow portion 16 of a cooling duct 14 here in this instance run so as to be radially mutually adjacent within one winding groove 6, for example. In FIG. 6*c*, two first connection ports 24 and two second connection ports 25 are in each case disposed so as to be radially mutually offset in an alternating manner in the circumferential direction U. This is possible when the cooling ducts 14 are configured as cooling loops which are disposed so as to be mirror-symmetrical in relation to one another. This means that in the case of two neighboring cooling ducts 14, the supply flow portions 15 are configured so as to neighbor one another, and the return flow portions 16 are disposed so as to be outside along the circumferential direction U. The cooling fluid which is directed into the supply flow portions 15 of two neighboring cooling ducts 14 here thus flows once in the circumferential direction U into the associated return flow portion 16, and once counter to the circumferential direction U into the associated return flow portion 16. The connection ports 24, 25 are thus disposed in an alternating manner so as to be twice symmetrical along the circumferential direction U.

Figure 6D:
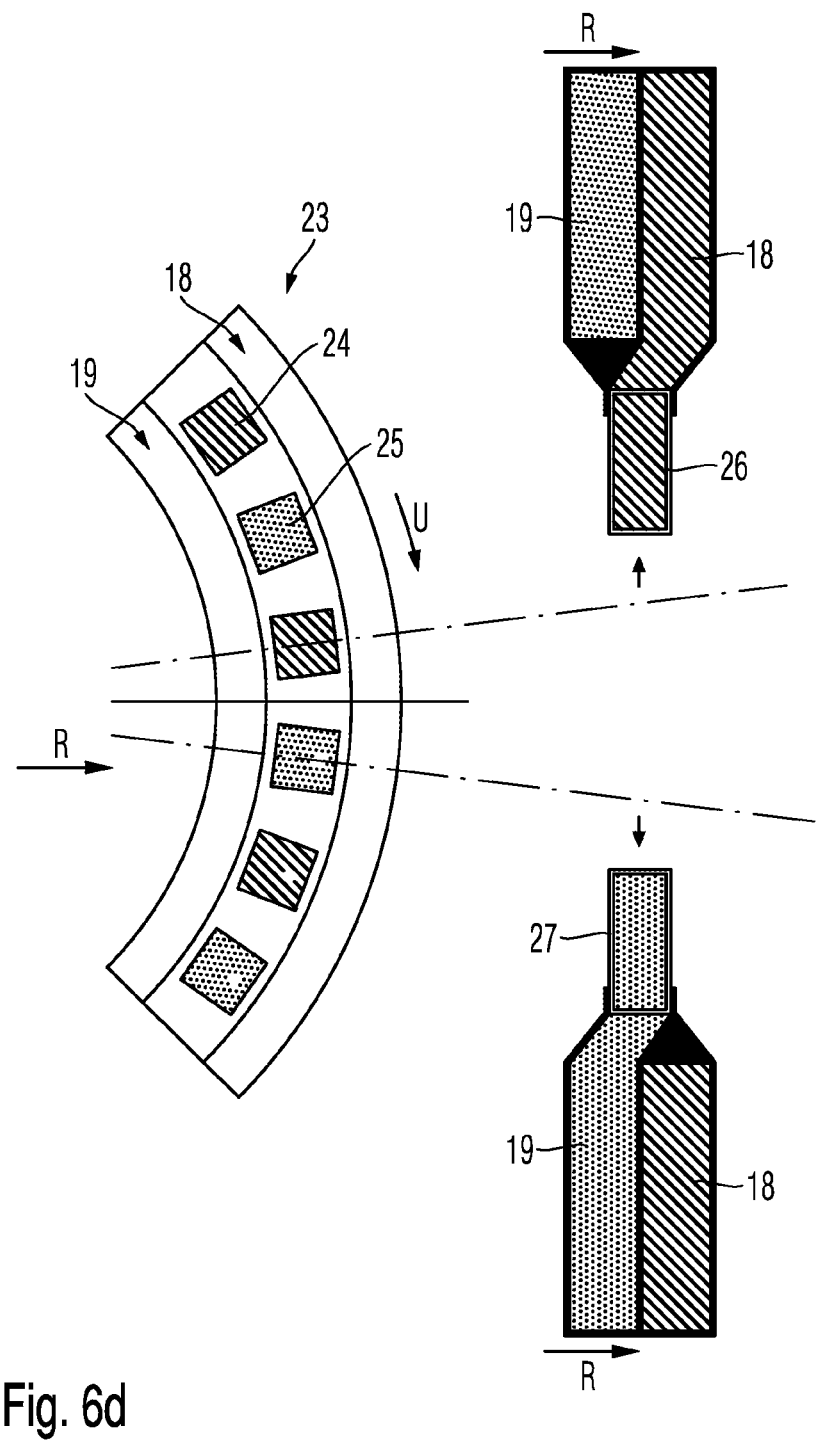

A further embodiment of the base 23 is shown in FIG. 6*d*. The connection ports 24, 25 there are disposed so as to be mutually offset only in the circumferential direction U but not in the radial direction R. The connection ports 24, 25 are disposed so as to alternate in an annular arrangement, wherein the fluid ring ducts 18, 19 in a radially inward and outward manner are adjacent to the annular arrangement. The distribution duct 18 in a radially outward manner and the collection duct 19 here in a radially inward manner thus are adjacent to the collection duct 19. The ends 26, 27 of the cooling ducts 14, which are configured as cooling loops, here are configured so as not to be bent, or straight, respectively. This variant can be produced in a particularly simple and cost-effective manner.

In order for the fluid ring ducts 18, 19 to now be configured with the flow cross sections $Q1(U)$, $Q2(U)$ which are a function of the location along the circumferential direction U, the fluid ring 11 has an encircling separation web 28 (see FIG. 4, FIG. 5) which is disposed between the lateral walls 20, 21 within the fluid ring 11. The separation web 28 runs radially between the connection ports 24, 25 which are disposed in an annular manner. The separation web 28 divides the fluid ring interior of the fluid ring 11 in the radial and in the axial direction and divides the consistent overall flow cross section Q according to the requirement into the flow cross sections $Q1(U)$, $Q2(U)$. The separation web 28 for radially dividing has an axially extending separation wall 29 which is encircling in the circumferential direction U. The collection duct 19 here runs so as to be adjacent to an internal side 30 of the separation wall 29, and the distribution duct 18 here runs so as to be adjacent to an external side 31 of the separation wall 29. For axially dividing, the separation web 28 has a collar 32 which projects radially from the separation wall 29 and has two collar portions 33, 34. A first collar portion 33 projects radially inward and runs within a first fluid ring half 35. A second collar portion 34 projects radially outward and runs within a second fluid ring half 36. Transitions 37 between the fluid ring halves 35, 36 here are disposed so as to be offset by ±90° in relation to the cooling fluid connectors 12, 13. The cooling fluid connectors 12, 13 thus lie so as to be centric in the respective fluid ring half 35, 36.

The separation web 28 has a height $H(U)$ which is a function of the circumferential angle. The first collar portion 33 in the first fluid ring half 35, as a function of the circumferential angle, thus lies at different height levels and, as a function of the circumferential angle, delimits a second axial extent $Z2(U)$ (see FIG. 3, for example) of the collection duct 19. The second collar portion 34 in the second fluid ring half 36, as a function of the circumferential angle, likewise lies at different height levels and, as a function of the circumferential angle, delimits a first axial extent $Z1(U)$ (see FIG. 3, for example) of the distribution duct 18. The height $H(U)$ of the separation web 28 in the region of the cooling fluid connectors 12, 13 here is minimal such that in the first fluid ring half 35, the second axial extent $Z2(U)$ of the collection duct 19 in the region of the inflow connector 12 is minimal, and in the second fluid ring half 36, the first axial extent $Z1(U)$ of the distribution duct 28 in the region of the outflow connector 13 is minimal. As a result, the proportion of the second flow cross section $Q2(U)$ of the overall flow cross section Q in the region of the inflow connector 12 is minimal, and the proportion of the first flow cross section $Q1(U)$ of the overall flow cross section Q in the region of the outflow connector 13 is minimal. The height $H(U)$ of the separation web 28 is maximal in the region of the transitions between the fluid ring halves 35, 36.

Figure 7:
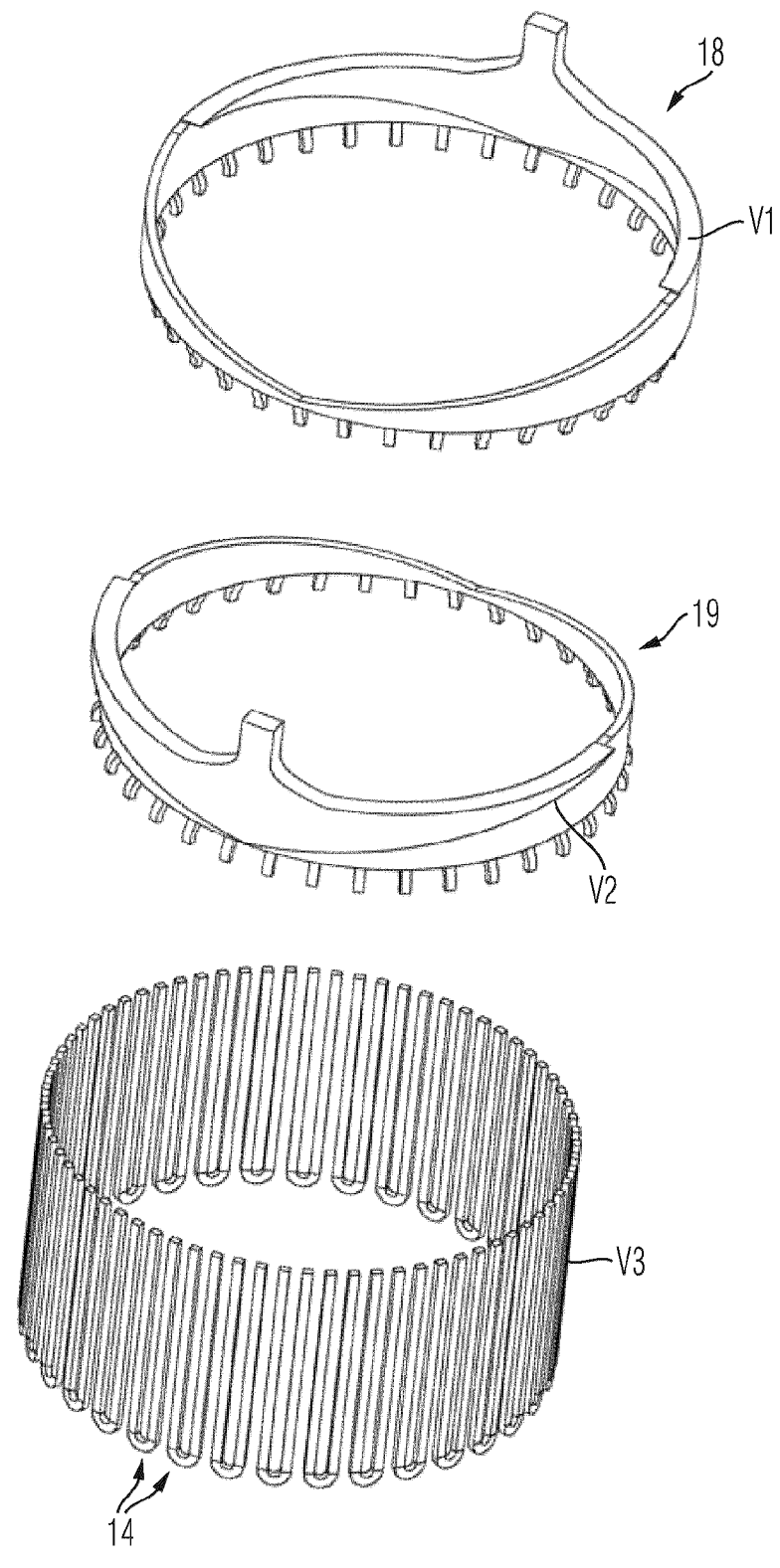
FIG. 7 shows an illustration of the cooling device in the fluid chamber.

The fluid ring ducts 18, 19 and the fluid ducts in the fluid chamber are shown in FIG. 7. To this end, the flow volumes V1, V2, V3 for the cooling fluid which are delimited by the fluid ring ducts 18, 19 and the cooling ducts 14 are shown, wherein the first flow volume V1 is assigned to the distribution duct 18, the second flow volume V2 is assigned to the collection duct 19, and the third flow volume V3 is assigned to the cooling ducts 14. The fluid ring ducts 18, 19 for configuring the fluid ring 11 are thus configured as rings in the form of a distribution ring and a collection ring which are nested in one another. As a result, the fluid ring 11 can be configured to meet a minimum requirement in terms of installation space.

Figure 8:
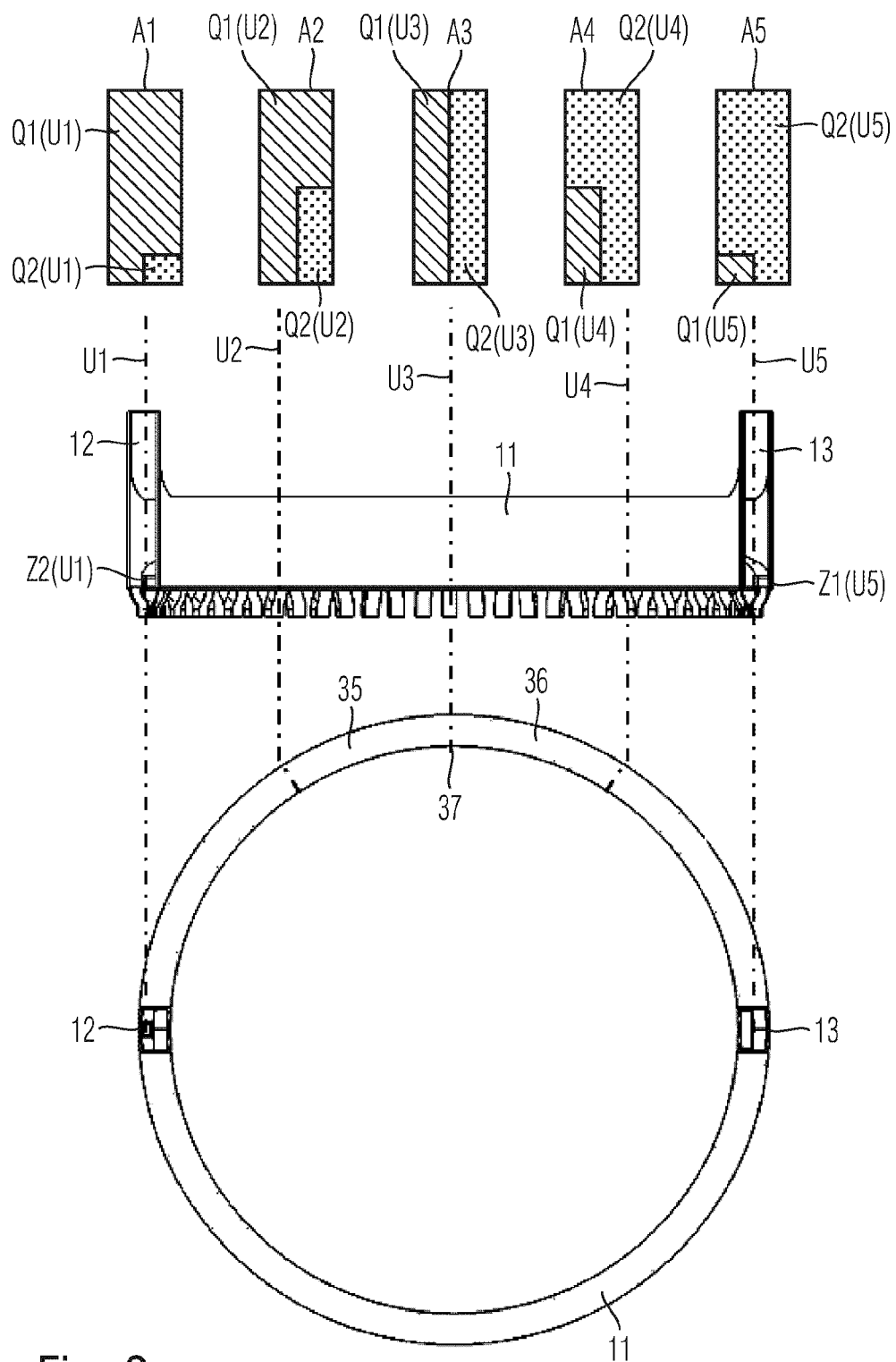
FIG. 8 shows an illustration of flow cross section profiles across a ring half.
Figure 9:
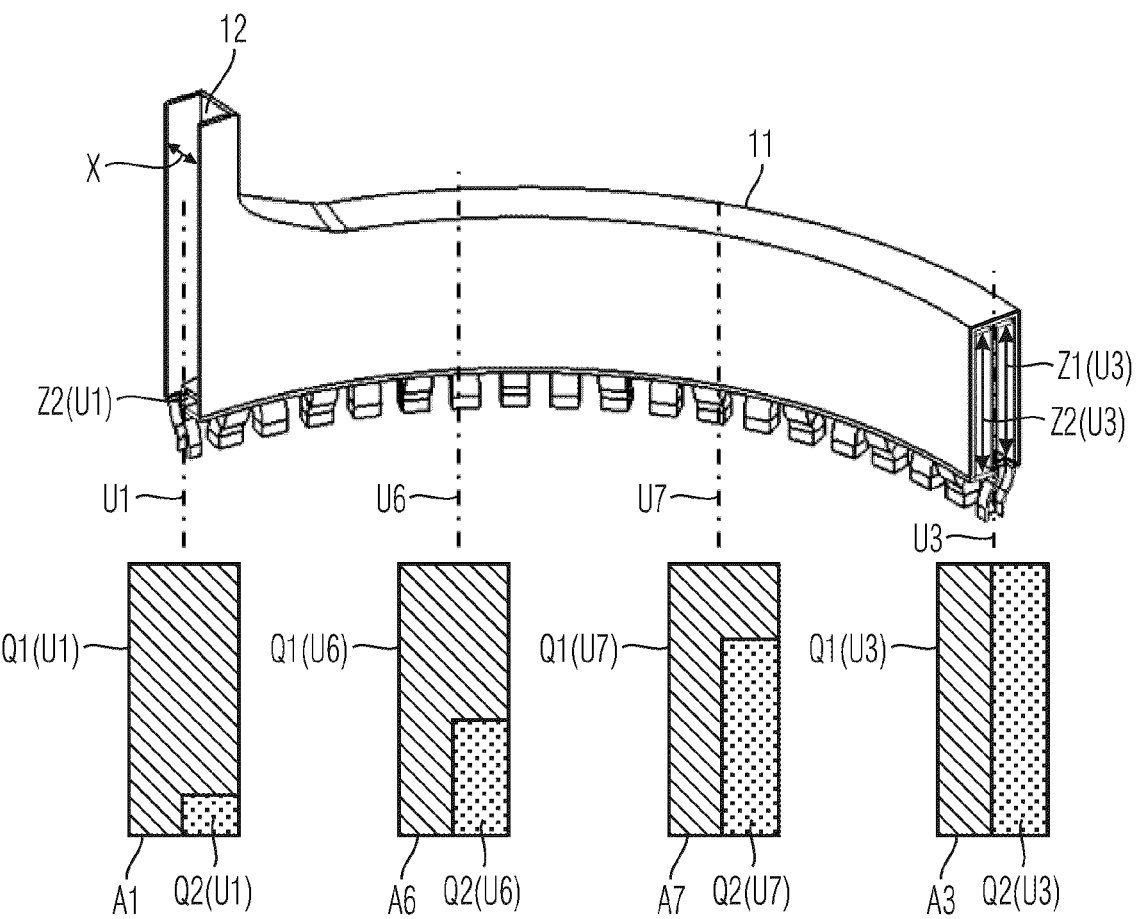
FIG. 9 shows an illustration of flow cross section profiles across a ring quarter segment.

FIG. 8 shows the fluid ring 11 in a plan view and in a cross-sectional view through the cooling fluid connectors 12, 13. Divisions A1, A2, A3, A4, A5 of the overall flow cross section Q for different circumferential angles U1, U2, U3, U4, U5 are shown on the first flow cross section $Q1(U)$ and the second flow cross section $Q2(U)$. A first circumferential angle U1 is 0° and corresponds to a position of the inflow connector 12. A fifth circumferential angle is 180° and corresponds to a position of the outflow connector 13. A third circumferential angle U3 is 90° and lies so as to be centric between the first circumferential angle U1 and the fifth circumferential angle U5. In the case of this third circumferential angle U3, the transition 37 lies between the two fluid ring halves 35, 36. A second circumferential angle U2 is, for example, 45° and lies so as to be centric between the third circumferential angle U3 and the first circumferential angle U1. A fourth circumferential angle U4 is, for example, 135° and lies so as to be centric between the third circumferential angle U3 and the fifth circumferential angle U5. A quarter segment of the fluid ring 11 having additional divisions A6 and A7 at the circumferential angles U6 and U7 which lie between the circumferential angles U1 and U3 is shown in FIG. 9. A sixth circumferential angle U6 corresponds to, for example, 30° and thus lies between the circumferential angles U1 and U2. A seventh circumferential angle U7 corresponds to, for example, 60° and thus lies between the circumferential angles U2 and U3.

In the case of the first circumferential angle U1, the axial extent $Z2(U1)$ of the collection duct 19 is minimal. As a result, the distribution duct 18 is guided so as to be radially next to the collection duct 19 as well as axially above the latter. The overall flow cross section in the radial direction R along the second axial extent $Z2(U1)$ of the collection duct 19 is thus divided equally between the collection duct 19 and the distribution duct 18. The distribution duct 18 in the axial direction above the collection duct 19 extends across the entire radial extent X, or radial width, respectively, of the fluid ring 11. It can thus be seen by way of the first division A1 that the first flow cross section $Q1(U1)$ is significantly larger than the second flow cross section $Q2(U1)$.

The converse applies in the case of a fifth circumferential angle U5 of 180°, which corresponds to the position of the outflow connector 13. The first axial extent $Z1(U5)$ of the distribution duct 18 there is minimal. As a result, the collection duct 19 is guided so as to be radially next to the distribution duct 18 as well as axially above the latter. The overall flow cross section in the radial direction R along the first axial extent Z1(U5) of the distribution duct 18 is thus divided equally between the collection duct 19 and the distribution duct 18. The collection duct 19 in the axial direction above the distribution duct 18 extends in the radial direction R across the entire radial extent X of the fluid ring 11. It can thus be seen by way of the fifth division A5 that the first flow cross section Q1(U1) is significantly smaller than the second flow cross section Q2(U1). The distribution duct 18 and the collection duct 19 at the third circumferential angle U3, thus in the center between the inflow connector 12 and the outflow connector 13, share the overall flow cross section Q and thus have identical axial extents Z1(U3)=Z2(U3). It can also be seen by way of the third division A3 that the flow cross sections Q1(U3)=Q2(U3) are of identical size.

In the case of the second circumferential angle U2 the second axial extent Z2(U2) of the collection duct 19 is half the axial extent Z of the fluid ring 11. As can be seen by way of the second division A2, the second flow cross section Q2(U2) has increased in comparison to the second flow cross section Q2(U1). The first flow cross section Q1(U2) has decreased by the same extent in relation to the first flow cross section Q1(U1). The converse applies to the fourth circumferential angle U4 at which the first axial extent Z1(U4) of the distribution duct 18 is half the axial extent Z of the fluid ring 11. As can be seen by way of the fourth division A4, the first flow cross section Q1(U4) has decreased in relation to the first flow cross section Q1(U3), and the second flow cross section Q2(U4) has increased by the same extent in comparison to the second flow cross section Q2(U3). It is visualized by way of the divisions A6, A7 in FIG. 9 that, proceeding from the first division A1, the second flow cross section Q2(U6), Q2(U7) is enlarged in steps, while the first flow cross section Q1(U6), Q1(U7) simultaneously shrinks until the flow cross sections Q1(U3), Q2(U3) have approximated one another at the circumferential angle U3=90°. By enlarging the axial extent Z1(U), Z2(U) of the one fluid ring duct 18, 19, the proportion of the other fluid ring duct 19, 18 which is axially guided by way of this fluid ring duct 18, 19 is reduced. As a result, the flow cross sections Q1(U), Q2(U) can be varied in opposite directions.

Figures 10A, 10B:
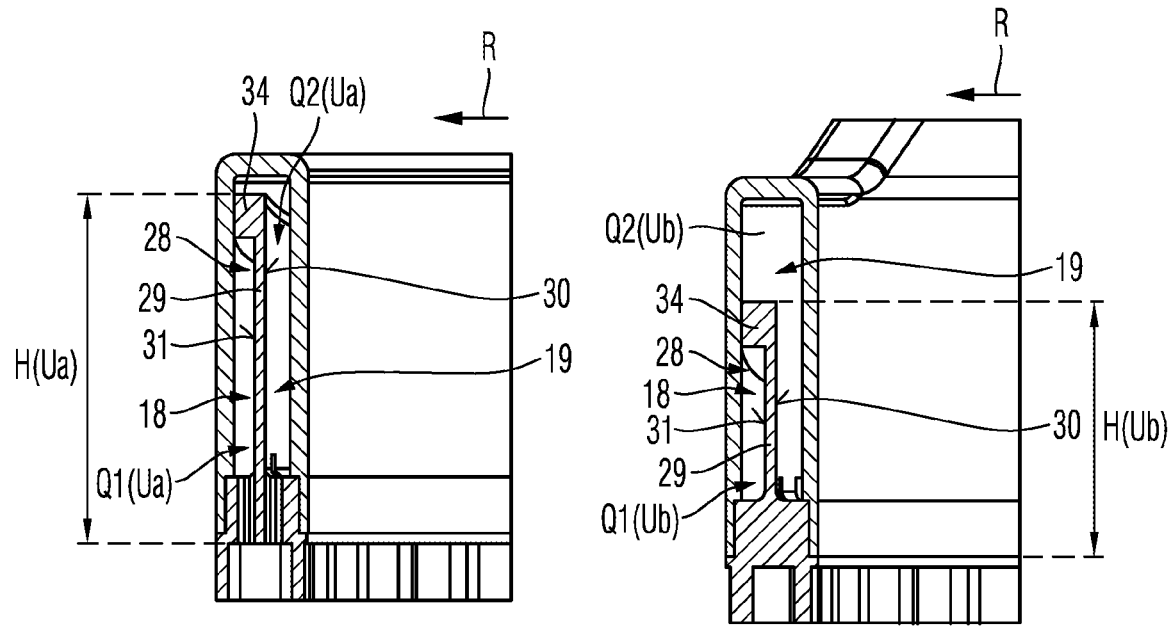
FIGS. 10a, 10b show illustrations of cross sections through the fluid ring at different circumferential points.
Figure 11:
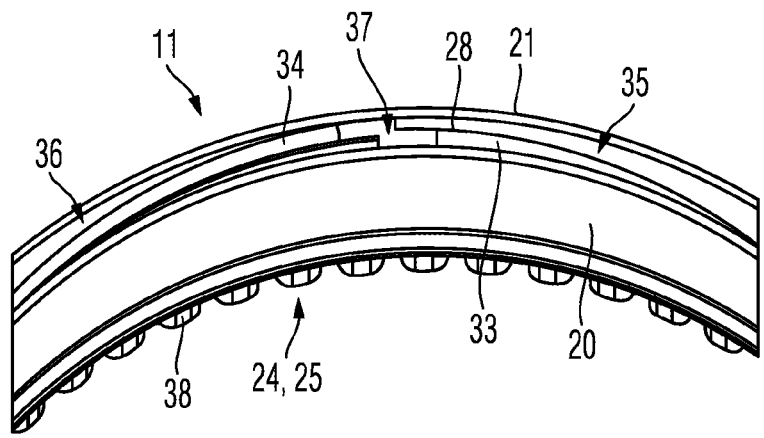
FIG. 11 shows a perspective illustration of the fluid ring of the cooling device without a cover.

Enlarged cross-sectional illustrations through the fluid ring 11 in the first fluid ring half 35, having the outwardly protruding collar portion 34, are shown in FIG. 10a, FIG. 10b. The height H(Ua) of the separation wall 28 in FIG. 10a is larger than the height H(Ub) of the separation wall 28 in FIG. 10b. As a result, the second flow cross section Q2(Ub) of the collection duct 19 in FIG. 10b is larger than the second flow cross section Q2(Ua) of the collection duct 19 in FIG. 10a. Likewise, the first flow cross section Q1(Ub) of the distribution duct 18 in FIG. 10b is smaller than the first flow cross section Q1(Ua) of the collection duct 19 in FIG. 10a. A plan view of the fluid ring 11 without a cover is shown in FIG. 11. Shown above all is the transition 37 between the two fluid ring halves 35, 36, where the radially opposing collar portions 33, 34 are mutually adjacent and the collar portion 32 thus changes its radial orientation. It is moreover shown that the connection ports 24, 25 can also be configured as plug sockets 38 into which the ends 26, 27 of the cooling ducts 14 can be inserted.

Figure 12A:
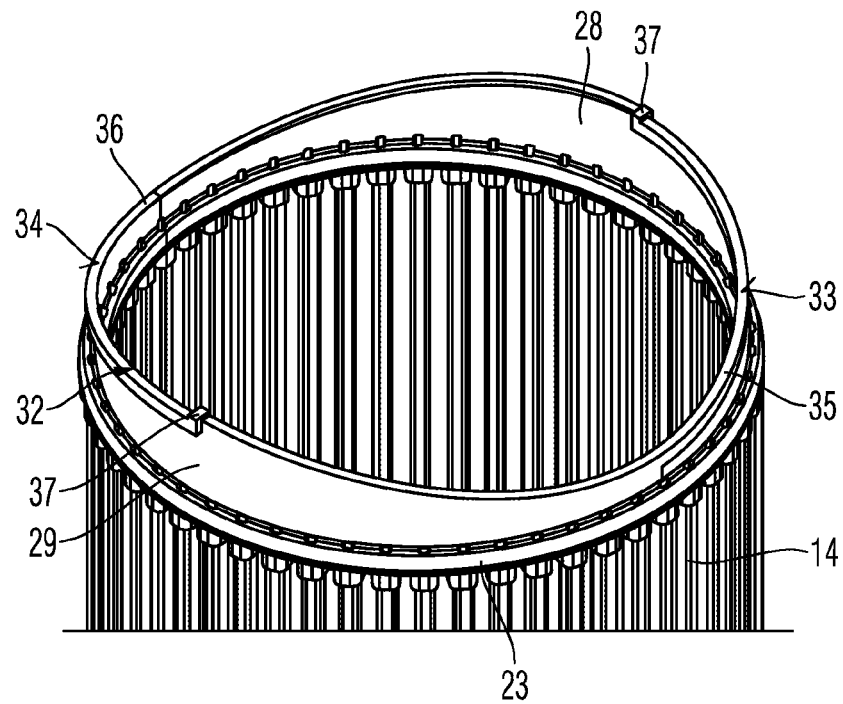
FIGS. 12a, 12b show schematic perspective illustrations of components of the cooling device formed from plastics material.
Figure 12B:
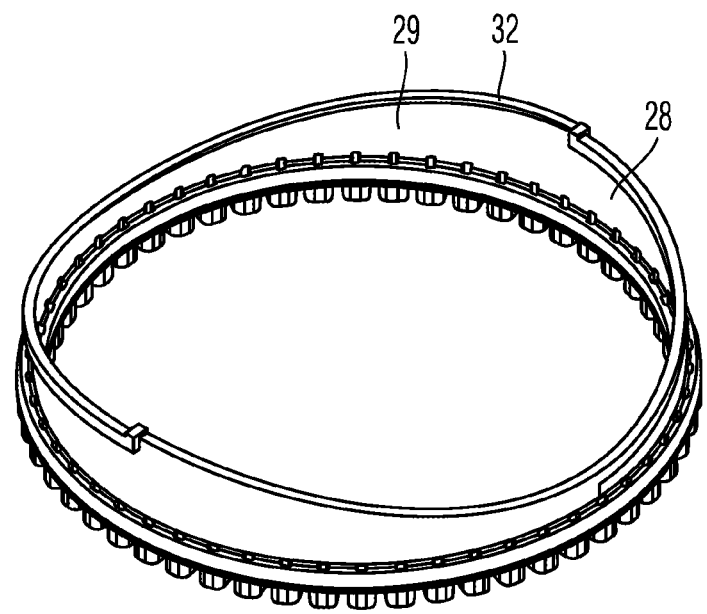

An embodiment of the separation web 28, of the base 23 and of the cooling ducts 14 is shown in FIG. 12a. The separation web 28 and the base 23 are shown in FIG. 12b.

Figure 13A:
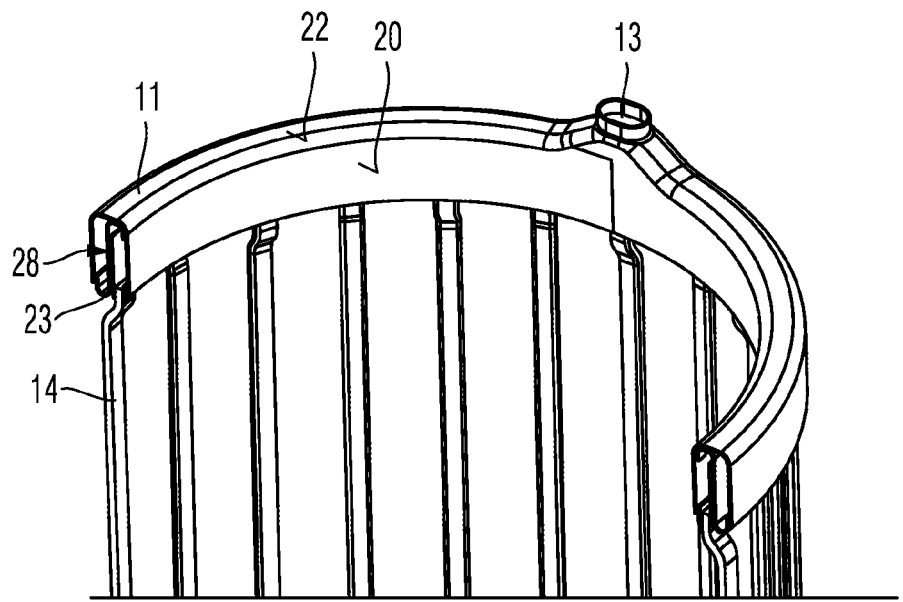
FIGS. 13a, 13b show schematic perspective illustrations of components of the cooling device formed from sheet metal.
Figure 13B:
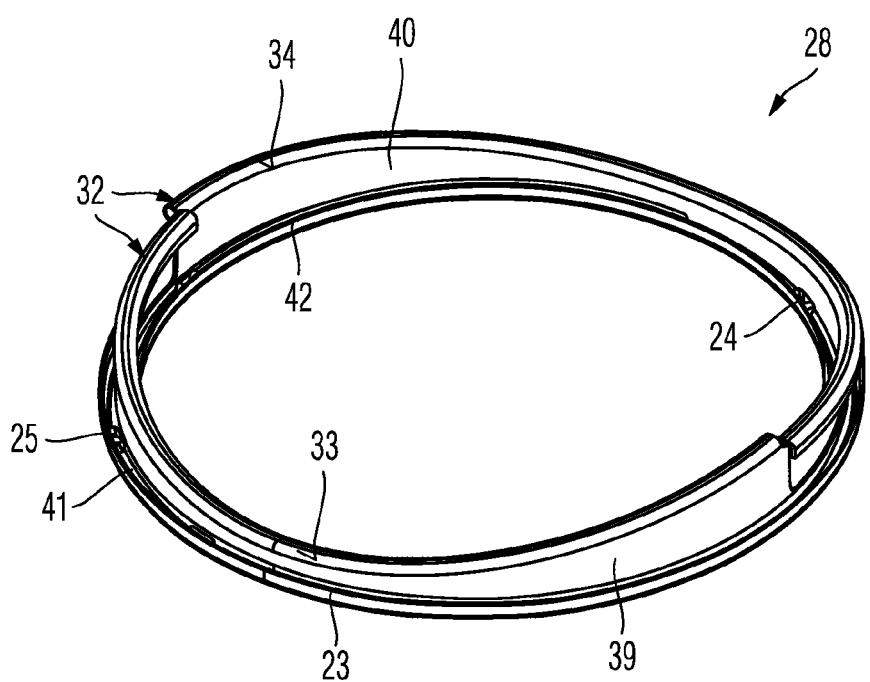

The separation web 28 and the base 23 here are integrally configured from a plastics material. For example, the separation web 28 having the separation wall 29 and the collar 32, and the base 23 can be configured as an injection-molded part. A further embodiment of the fluid ring 11 and of the cooling ducts 14 is shown in FIG. 13a. The separation web 28 and the base 23 are shown in FIG. 13b. The separation web 28 and the base 23 are configured as ring elements 39, 40 which are nested in one another and formed from sheet metal. Each ring element 39, 40 has a trough 41, 42 which is encircling in the circumferential direction U, wherein the first, radially inward protruding trough 41 forms the region of the base 23 that has the first connection ports 24, and the second, radially outward protruding trough 42 forms the region of the base 23 that has the second connection ports 25. The ring elements 39, 40 have an S-shaped cross section.

What is claimed is:

1. A cooling device for a stator of an electric machine, for fitting together with a hollow-cylindrical laminated core of the stator, the cooling device comprising:
   a plurality of cooling ducts for directing cooling fluid along the laminated core; and
   a fluid ring which, for disposing on an end side of the laminated core, is connected to the cooling ducts and, in a flow direction oriented along a circumferential direction, is able to be passed through by a flow of cooling fluid, wherein:
   the fluid ring comprises:
      two fluid ring ducts comprising a distribution duct for distributing the cooling fluid to the cooling ducts and a collection duct for receiving the cooling fluid from the cooling ducts, and
      at least two cooling fluid connectors comprising at least one inflow connector for directing the cooling fluid into the distribution duct and at least one outflow connector for retrieving the cooling fluid from the collection duct,
   the fluid ring ducts, for uniformly distributing the cooling fluid to the cooling ducts, in the flow direction have flow cross sections which are a function of a circumferential angle,
   the distribution duct is configured with a first flow cross section which, proceeding from the at least one inflow connector, decreases as a number of cooling ducts already supplied with cooling fluid increases,
   the collection duct is configured with a second flow cross section which increases as a number of already emptied cooling ducts increases toward the at least one outflow connector, and
   the at least one inflow connector and the at least one outflow connector are radially mutually opposite and disposed to be mutually offset by approximately 180° along the circumferential direction.

2. The cooling device according to claim 1, wherein each of the cooling ducts comprises:
   one supply flow portion which is fluidically connected to the distribution duct;
   one return flow portion which is fluidically connected to the collection duct; and
   one deflection portion which, for deflecting the cooling fluid from the supply flow portion to the return flow portion, is connected in a fluid-tight manner to the supply flow portion and the return flow portion.

3. The cooling device according to claim 2, wherein the fluid ring ducts are disposed to radially neighbor one another and, by way of ends of the supply flow portions and of the return flow portions that are connected to the fluid ring for connecting to the respective fluid ring duct, are configured to be at least one of radially mutually offset or mutually offset along the circumferential direction.

4. The cooling device according to claim 1, wherein the first flow cross section and the second flow cross section in the flow direction, proceeding from the inflow connector along the circumferential direction in the direction of the outflow connector, are configured to be variable in opposite directions such that an overall flow cross section of the fluid ring is consistent along the circumferential direction.

5. The cooling device according to claim 1, wherein the fluid ring has a plurality of external walls that enclose a fluid ring interior, and a separation web which is encircling in the circumferential direction and is disposed in the fluid ring interior and, as a function of the circumferential angle, is configured to divide an overall flow cross section of the fluid ring into the first flow cross section and the second flow cross section.

6. The cooling device according to claim 5, wherein the external walls are configured as two concentrically disposed cylindrical lateral walls, as an annular base with connection ports for the cooling ducts, and as an annular cover which lies axially opposite the annular base and has the cooling fluid connectors.

7. The cooling device according to claim 5, wherein the separation web is configured to divide the overall flow cross section in the radial direction and the axial direction as a function of the circumferential angle.

8. The cooling device according to claim 7, wherein the separation web is configured:
   in a first fluid ring half, to reduce the first flow cross section in the flow direction, for increasing an axial proportion of the second flow cross section of the overall flow cross section from a minimum value in a region of the inflow connector up to a maximum value in a region of transitions between the first fluid ring half and a second fluid ring half, thus reducing a radial proportion of the first flow cross section of the overall flow cross section; and
   in the second fluid ring half, to increase the second flow cross section in the flow direction, for reducing an axial proportion of the first flow cross section of the overall flow cross section from the maximum value in the region of the transitions to the minimum value in the region of the outflow connector, thus increasing a radial proportion of the second flow cross section of the overall flow cross section;
   wherein the flow cross sections in the region of the transitions have identical axial and radial proportions of the overall flow cross section and thus are of substantially identical size.

9. The cooling device according to claim 8, wherein:
   the separation web is configured to have a height which is a function of the circumferential angle, and for radially dividing has an axially extending separation wall, and for axially dividing has a collar which has two collar portions and projects radially from the separation wall,
   a first collar portion which runs within the first fluid ring half protrudes radially in a first direction and defines an axial proportion of the second flow cross section, and
   a second collar portion which runs within the second fluid ring half protrudes radially in a second direction, counter to the first direction, and defines an axial proportion of the first flow cross section.

10. The cooling device according to claim 1, wherein at least the fluid ring is configured from a plastics material or from a sheet metal.

11. An electric machine for a motor vehicle, the electric machine comprising:
    a stator,
    a rotor, and
    the cooling device according to claim 1, wherein:
    the stator has a hollow-cylindrical laminated core and windings,
    the fluid ring is disposed on a first end side of the laminated core, and the cooling ducts are disposed axially along the laminated core.

12. A motor vehicle comprising the electric machine according to claim 11.

* * * * *